(12) United States Patent
Baer

(10) Patent No.: US 7,502,063 B2
(45) Date of Patent: Mar. 10, 2009

(54) CAMERA WITH SCALABLE RESOLUTION

(75) Inventor: Richard L. Baer, Los Altos, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 907 days.

(21) Appl. No.: 10/915,591

(22) Filed: Aug. 9, 2004

(65) Prior Publication Data
US 2006/0028564 A1     Feb. 9, 2006

(51) Int. Cl.
*H04N 5/222* (2006.01)
(52) U.S. Cl. .............................. 348/333.01; 348/231.3; 348/333.02; 382/298; 345/190; 358/518
(58) Field of Classification Search .................. 348/294, 348/333.01, 333.02; 382/299, 164
See application file for complete search history.

(56) References Cited

U.S. PATENT DOCUMENTS

| | | | | | |
|---|---|---|---|---|---|
| 5,319,395 | A | * | 6/1994 | Larky et al. .................. | 345/605 |
| 2003/0007078 | A1 | | 1/2003 | Feldis, III | |
| 2003/0098915 | A1 | * | 5/2003 | Hyodo et al. ................ | 348/252 |
| 2003/0142376 | A1 | * | 7/2003 | Tabata et al. ................ | 358/518 |
| 2003/0223649 | A1 | * | 12/2003 | Findlater et al. ............ | 382/298 |
| 2004/0061797 | A1 | * | 4/2004 | Takahashi et al. .......... | 348/333.01 |
| 2004/0090641 | A1 | | 5/2004 | Namikata | |
| 2004/0268267 | A1 | | 12/2004 | Moravcsik | |
| 2005/0226539 | A1 | * | 10/2005 | Schweng ..................... | 382/300 |

FOREIGN PATENT DOCUMENTS

| | | |
|---|---|---|
| EP | 1583031 A1 | 3/2004 |
| GB | 2321361 | 7/1998 |
| JP | 2002223380 | 8/2002 |
| WO | WO2004/077357 A1 | 9/2004 |

OTHER PUBLICATIONS

GB Search Report dated Dec. 19, 2005.
Agilent Data Sheet for ADCM-2650-0001 "Portrait VGA Resolution CMOS Camera Module".
Search Report for British Patent Application No. 0514485.2 dated Sep. 26, 2006.

* cited by examiner

*Primary Examiner*—David L Ometz
*Assistant Examiner*—Ahmed A Berhan
(74) *Attorney, Agent, or Firm*—Ratner Prestia

(57) ABSTRACT

Camera that generates output images of configurable resolutions is described. The camera includes a resolution controller that receives an image with a first resolution, a horizontal scaling factor, and a vertical scaling factor, and based thereon generates an output image with a second resolution. A memory buffer is coupled to the resolution controller and stores at least one output image.

21 Claims, 7 Drawing Sheets

CAMERA WITH SCALABLE RESOLUTION

BACKGROUND OF THE INVENTION

Camera modules include an imaging integrated circuit (chip) packaged with optics. These camera modules are useful for manufacturers of consumer devices, such as cellular telephone manufacturers that want to integrate a camera into their cellular telephones. The Agilent CMOS ADCM-2650-0001 Camera Module product is an example of a camera module that is available from the assignee of the current patent application.

The camera module generates output images at a rate determined by the internal circuits of the module (e.g., the imager chip). Other components that use the output images generated by the camera must accept the output images at the rate set by the camera module. In other words, the camera module (e.g., the imager chip) sets the rate at which the other components must process or store the output images. Otherwise, information is lost. For many applications, such as video applications, the other components that interface to the camera module must employ expensive frame memories or digital signal processors to accommodate the rate at which the camera module generates the output images. This undesirably increases the cost of such components and at the same time limits certain types of image processing and requires the use of expensive DSP integrated circuits and memories. In other words, it is difficult if not impossible for less powerful processors or components with limited memory to use output images generated by the camera module, thereby increasing the difficulty of integrating such components with the camera module.

Moreover, existing cameras produce images of fixed resolution. For example, VGA has a resolution of 480×640 pixels. Some cameras have a feature where a user can select a region of interest that is smaller than the field of view and apply a digital zoom feature.

Other cameras have a feature where images of reduced resolution image can be generated by sub-sampling for display on a small screen (e.g., a display on a cellular telephone). For example, the camera module noted previously includes a sizer that performs sub-sampling on a sensor image to generate an output image for display on a small screen, for example. However, when sub-sampling light information is lost and may lead to undesirable image artifacts. Also, the bit depth in prior art cameras is not adjustable.

In a system that performs image processing with limited computational resources, these prior art cameras are a severe disadvantage. In such systems, it is important to reduce energy consumption and to save processing time. In order to achieve these goals, it is important to provide an image to a computing resource with the minimum resolution necessary to achieve the desired image processing result.

Based on the foregoing, there remains a need for a camera that can generate output images with configurable resolution and that overcomes the disadvantages set forth previously.

SUMMARY OF THE INVENTION

According to one embodiment of the present invention, a camera that generates output images of configurable resolution is described. The camera includes a resolution controller that receives an image with a first resolution, a horizontal scaling factor, and a vertical scaling factor, and based thereon generates an output image with a second resolution. A memory buffer is coupled to the resolution controller and stores at least one output image.

According to one embodiment of the present invention, a camera that generates an output image with a scalable resolution is described. An image sensor receives light and based thereon generates an input image with a plurality of rows and columns based on the received light. The input image generated by the image sensor has a native resolution of M×N. A resolution controller is coupled to the image sensor and receives the input image or some sub-window thereof, a horizontal scaling factor, and a vertical scaling factor and based thereon generates an output image with a new resolution. A memory buffer is optionally provided for storing one of a temporary result and the output image.

According to one embodiment, the resolution controller scales the horizontal dimension of the input image by the HSF and scales the vertical dimension of the input image by the VSF by applying a monochrome average operation to the input image.

According to another embodiment, the resolution controller scales the horizontal dimension of the input image by the HSF and scales the vertical dimension of the input image by the VSF by applying a mosaic preserving average operation to the input image. The output image in this case includes color information.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

A camera with scalable resolution and methods related thereto are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Camera 100

Figure 1:
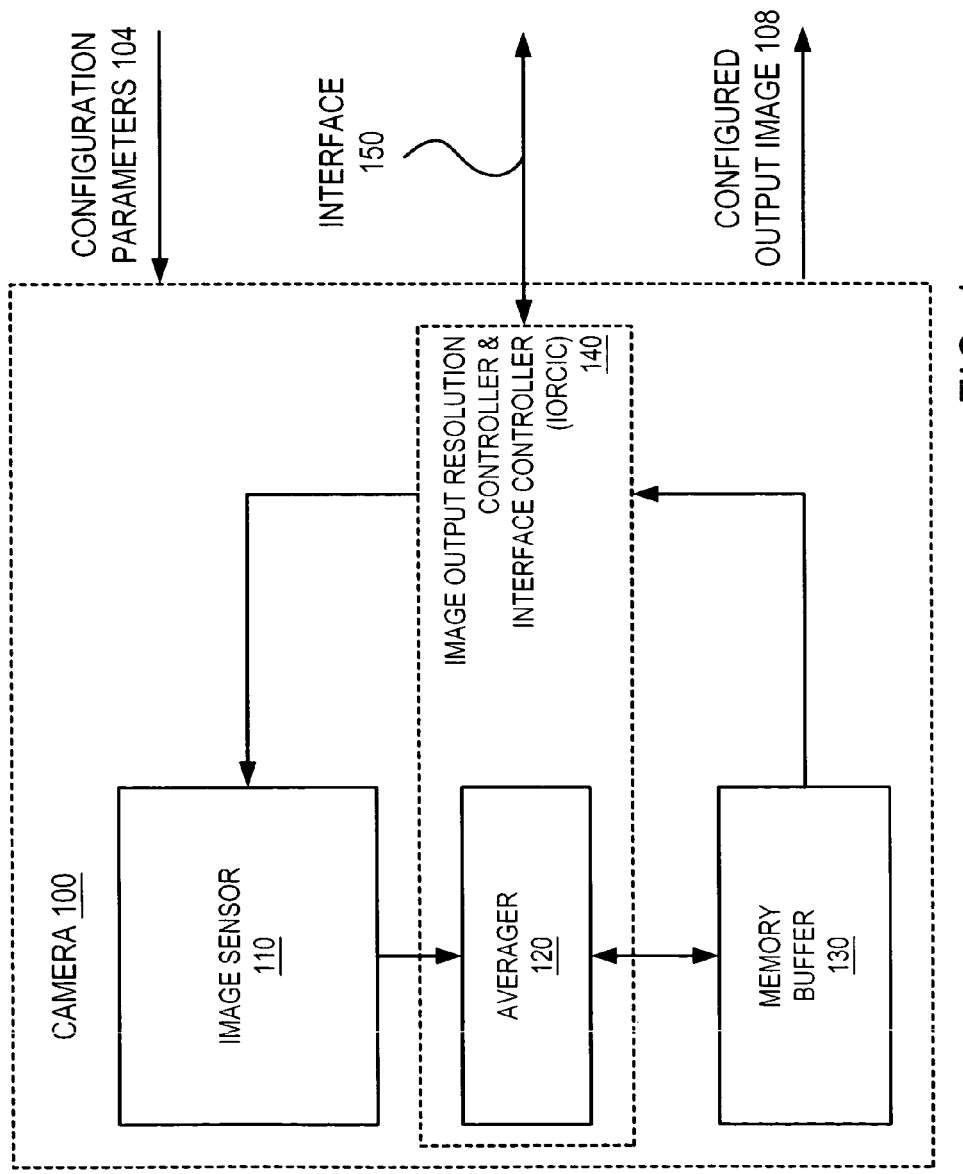
FIG. 1 illustrates a camera according to one embodiment of the invention.

FIG. 1 illustrates a camera 100 according to one embodiment of the invention. The camera 100 includes an image sensor 110, an averaging mechanism 120, a memory buffer 130, and an image output resolution controller and interface controller (IORCIC) interface 140. The camera 100 receives one or more configuration parameters 104 that specify characteristics or parameters related to the output image. Based on these configuration parameters 104, the camera generates a configured output image 108 (e.g., an output image that is configured to comply with the configuration parameters). For example, the output image 108 may have a configured resolution, a configured bit depth, or both. Examples of the configuration parameters 104 and configured output image 108 are described in greater detail hereinafter.

The camera 100 can be any image capture device (e.g., a digital still camera or a digital video camera). The camera 100 includes optics (not shown) to direct and focus light onto the image sensor 110. It is noted that the camera 100 can include other well-known components that are not described herein in order to avoid unnecessarily obscuring the present invention.

The image sensor 110 is also referred to herein as an "imager." The image sensor 110 can be, for example, a CCD imager or CMOS imager. The CMOS imager is a preferred implementation because the processing (e.g., the averaging operations) can be integrated onto a single integrated circuit ("chip").

The averaging mechanism 120 averages a block or group of pixels. In one embodiment, the dimensions (e.g., vertical dimension and horizontal dimension) of the output images generated by IORCIC 140 are limited to values that are a power of two. For example, the horizontal dimension of the resolution of the output images is a power of 2 (e.g., 2, 4, 8, 16, 32, 64, 128, 256, etc.). Similarly, the vertical dimension of the resolution of the output images is a power of 2 (e.g., 2, 4, 8, 16, 32, 64, 128, 256, etc.).

Memory Buffer 130

The camera 100 employs a memory buffer 130 to perform the averaging. The memory buffer 130 is coupled to the resolution controller and stores at least one output image. The buffer 130 can also store one or more temporary results.

In one embodiment, the size of the memory buffer 130 is at least as large as the product of the row width and the buffer depth. In this embodiment, the memory buffer 130 is organized as 256 16-bit words. Values can be accumulated in the memory buffer 130 during both row and column averaging. When only column averaging is utilized, a single memory location is sufficient since the sensor outputs its data is row order.

The memory buffer 130 can be, for example, a two-line 256 pixel 16-bit buffer. In this example, this buffer 130 can be used to store an entire 32×32 pixel 8-bit image that is obtained as a user-selected region of interest (ROI) or as a result of averaging a larger region of the image. When the bit depth is decreased, more pixels can be stored in the same memory buffer 130. For example, when the bit depth is 4 bits, the same memory buffer 130 can store a 32×64 pixel image. Similarly, when the bit depth is 2 bits, the same memory buffer 130 can store a 64×64 pixel image It is noted that larger images (e.g., images that are larger than the memory buffer) can be transferred in several cycles to a computing resource by using multiple frame captures and transfers.

Since memory integrated circuits are sized by powers of two, by configuring the resolution of the output image sizes as powers of two, an integer number of image frames can be stored into a digital memory buffer (e.g., buffer 130).

For example, based on an imager 110 with a native resolution of 256×256, the averaging mechanism 120 according to the invention generates square images at every resolution step from 2×2 pixels to 256×256 pixels. The averaging mechanism 120 according to the invention can also produce non-square images (e.g., rectangular images) by operating on a rectangular region of interest (ROI) or by applying a first amount of averaging in the horizontal direction and a second amount of averaging in the vertical direction. For example, a first scaling factor (e.g., a first power of two (divide by 2)) can be applied to the pixels along a horizontal dimension, and a second scaling factor (e.g., a different power of two (divide by 4 or 8)) that is different from the firsts scaling factor can be applied to the pixels along a vertical dimension. The first scaling factor is referred to herein as a horizontal scaling factor, and the second scaling factor is referred to herein as a vertical scaling factor.

In one embodiment, a bit shift operation is performed to apply digital gain to the output image 224 or to reduce the bit depth of the output image 224. For example, each left shift multiplies the output value by a factor of two. Each right shift decreases the bit depth by one. It is noted that the application of digital gain can result in an overflow.

It is noted that other native resolutions may be used to create the scalable camera. For example, a VGA (480×640 pixels) can be used to provide image resolutions as low as 30×40 pixels. Also, averaging factors other than two can be utilized. However, the averaging mechanism would have a more complex implementation.

The scaling factors (e.g., HSF and VSF) can be selected based on 1) resolution required by a particular application, 2) magnification required by a particular application, 3) the capacity or size of the memory buffer 130, and 4) the capacity or size of the internal memory of the image processors or computing resources (e.g., 740 of FIG. 7) in a distributed network.

Controller (IORCIC) 140

Figure 2:
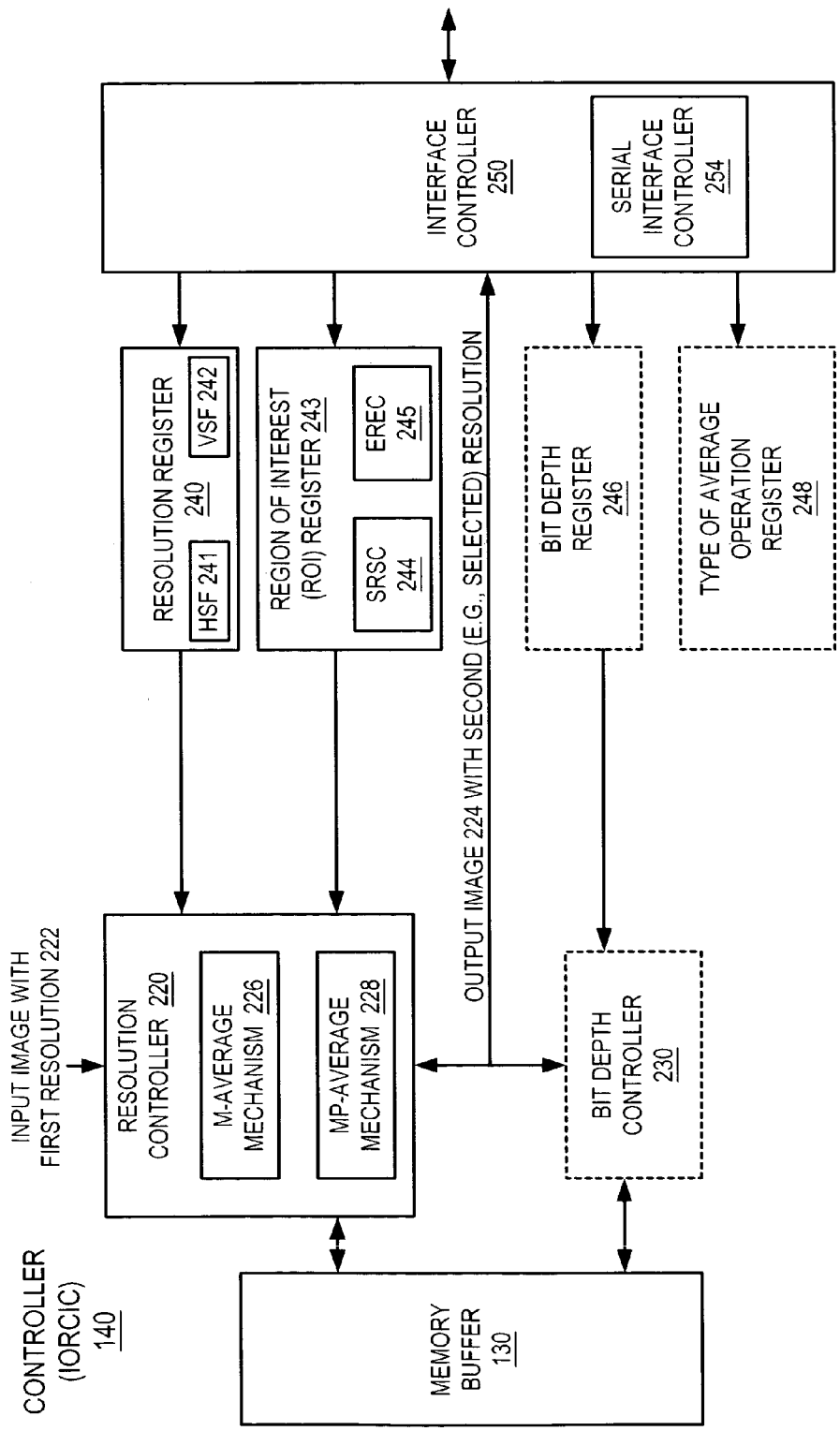
FIG. 2 illustrates in greater detail the image output resolution controller and interface controller of FIG. 1 according to one embodiment of the invention.

FIG. 2 illustrates in greater detail the controller 140 of FIG. 1 according to one embodiment of the invention. The controller 140 includes a resolution controller 220, a bit depth controller, a plurality of registers (e.g., 240, 243, 246, 248), and an interface (I/F) controller 250. The resolution controller 220 receives an input image 222 (e.g., image data with a first resolution or a region of interest with a first resolution). The first resolution can be specified in terms of the number of pixels in the horizontal direction and the number of pixels in the vertical direction. It is noted that the first resolution can be the native resolution offered by the image sensor 110.

Also, the resolution controller 220 receives one or more configuration parameters 104 (e.g., a horizontal scaling factor and a vertical scaling factor). Based on these configuration parameters 104, the resolution controller 220 generates an output image 224 with a second resolution (e.g., a new resolution based on the selected resolution).

Output Image Configuration Parameter Registers

According to one embodiment of the present invention, a plurality of registers for storing configuration parameters 104 are provided. These registers may be written with configuration parameters by an application, for example. These configuration parameters 104 are utilized by the resolution controller 220 and the bit depth controller 230 to configure the output image 224. In one embodiment, the output image 224 has a configurable resolution and a selectable bit depth. In another embodiment, the output image 224 only has a configurable or scalable resolution.

For example, the controller 140 includes a resolution register 240 that stores a horizontal scaling factor (HSF) 241 and a vertical scaling factor (VSF) 242. It is noted that in another embodiment, the HSF 241 and the VSF 242 can be stored in separate registers. For example, the controller 140 can include a HSF register that stores the HSF 241 and a separate VSF register that stores VSF 242.

The controller 140 also includes a region of interest (ROI) register 243 that stores a start row, start column (SRSC) 244 and an end row, end column (EREC) 245. It is noted that in another embodiment start row, start column (SRSC) 244 and an end row, end column (EREC) 245 can be stored in two separate registers. For example, the controller 140 can include a SRSC register that stores the SRSC 244 and a EREC register that stores the EREC 245. Alternatively, a separate register can be provided to store each parameter (e.g., four separate register for SR, SC, ER, and EC).

The controller 140 also optionally includes a bit depth register 246 that stores a bit depth when the controller 140 includes the bit depth controller 230. The controller 140 also optionally includes a type of average operation register 248 that stores a value to determine the type of average operation to perform on the input image data when both the M-average operation and the MP-average operation are provided by the controller 140.

The registers (e.g., 240, 243, 246, and 248) may be configured by writing a particular value to the registers in order to adjust or tailor the characteristics of the output image data to suit a particular application. The parameters, such as the resolution, bit depth, region of interest, HSF, and VSF may be configured or set by a computing resource (e.g., resource 740 in FIG. 7) by writing a corresponding value to the associated registers (e.g., 240, 243, 246, and 248). These registers may then be subsequently read by the resolution controller 220, averaging mechanisms 226, 228, and bit depth controller 230, for example, to obtain the parameters that affect the specific processing performed by these mechanisms. It is noted that the controller 140 can include other configuration registers that store other configuration parameters that affect the output image data.

Averaging Mechanisms 226, 228

In one embodiment, the resolution controller 220 includes a M-average mechanism 226 and a MP-average mechanism 228. In one embodiment, the resolution controller 220 employs either the M-average mechanism 226 or the MP-average mechanism 228 to change or adjust the resolution of the image data 222 into an output image 224 with a selected resolution. It is noted that in another embodiment, the controller (IORCIC) 140 includes a bit depth controller 230 that receives a selected bit depth and generates an output image 224 that has the selected bit depth (e.g., an image output where each pixel is represented by a selected number of bits (e.g., 8 bits)).

Specifically, the monochrome average mechanism 226 (M-average mechanism) sums the values of a group of pixels (e.g., adjacent pixels) and then divides the sum with the number of pixels in the group to obtain an average. The average value is then utilized to represent the group of pixels in the output image with the reduced resolution. The monochrome average operation generates a monochrome image without color information. The monochrome average operation according to the invention is described in greater detail hereinafter with reference to FIG. 4

Specifically, the mosaic preserving average mechanism 228 (MP-average mechanism) sums the values of a group of pixels (e.g., a group of pixels selected according to color of the pixel) and then divides the sum with the number of pixels in the group to obtain an average. The average value is then utilized to represent the group of pixels in the output image with the reduced resolution. The mosaic preserving average operation generates a color image with color information preserved therein. The mosaic preserving average operation according to the invention is described in greater detail hereinafter with reference to FIG. 5.

When the number of pixels in a group is a power of two, the division operation of the sum by the number of pixels in the group may be accomplished with a bit shift operation. For example, a division by four can be accomplished by a two bit right shift. In one embodiment, the summing register utilized for performing the average operation is configured to have a bit depth that is greater than the image pixel. When a 16-bit summing register is used, as many as 256 (8-bit) pixel values can be summed without overflowing the register.

In one embodiment, scaling factors (also referred to herein as averaging factors) of 2, 4, 8, and 16 may be selected along each image dimension (e.g., along the horizontal dimension and along the vertical dimension). When the camera 100 includes a native resolution of 256×256, the minimum image size is 16×16 pixels since each dimension can be divided by a maximum of a factor of 16 in this example.

However, it is noted that the number of rows and the number of columns in the original image can be any value up to the maximum number provided by the imaging array. Moreover, the HSF can be any number (e.g., an even or odd number) and is not limited to a power of two. Similarly, the VSF can be any number (e.g., an even or odd number) and is not limited to a power of two. Furthermore, the HSF and the VSF can be the same number, but also can be different. For example, a first scaling factor can be applied to the horizontal dimension and a second scaling factor that is different from the first scaling factor can be applied to the vertical dimension. In other cases, either the HSF or the VSF can be one in which case the dimension to which the scaling factor of one is applied is not adjusted (e.g., scaled or reduced).

The shape of the region of interest is also not limited to a square image where the number of rows is equal to the number of columns. For example, the region of interest can be a rectangular pixel array.

Furthermore, it is noted that the averaging operations noted previously can be applied to any block of pixels. For example, a 16×32 block of pixels can be output directly or created by averaging 128×256 pixels by a factor of eight along the horizontal dimension and along the vertical dimension.

The controller 140 and the components therein according to the invention can be implemented with hardware, firmware, software, or a combination thereof. For example, the resolution adjustment mechanisms, M-average operations, and MP-average operations can be implemented with a microprocessor or micro-controller integrated circuit that executes a program to perform the above-noted functions. Alternatively, the resolution adjustment mechanisms, M-average operations, and MP-average operations can be implemented as a hard-wired digital circuit that uses digital logic to implement the functions noted previously. For example, the resolution control mechanisms can be implemented as an application specific integrated circuit (ASIC) or application specific standard product (ASSP).

It is noted that various components of the camera 100 can be combined or integrated into a single component to reduce costs, part count, and size of the camera 100.

Interface (I/F) Controller 250

The interface (I/F) controller 250 manages and controls the communication between the interface 150 (e.g., a serial communication link) and the image sensor 110, averaging mechanism 120 and the memory buffer 130.

The interface 150 can be a serial link, such as I2C interface or SPI interface. I2C is an acronym for Inter Integrated Circuit (I2C) bus. I2C is a 2-wire serial interface standard defined by Philips Semiconductor. The I2C interface physically includes two active wires and a ground connection. The two active wires include a serial data line (SDA) and a serial clock line (SCL). The data line is bi-directional.

The I2C interface is a simple master/slave type interface that only requires two lines (a clock line and a data line) for full duplexed communication between multiple devices. The interface typically runs at a fairly low speed (e.g., 100 kHz to 400 kHz). With I2C, each integrated circuit (IC) coupled to the bus has a unique address. Integrated circuits ("chips") can act as a receiver and/or transmitter depending on the functionality of the chip.

The I2C interface is a simple master/slave type interface. Simplicity of the $I^2C$ system is primarily due to the bi-directional 2-wire design, a serial data line (SDA) and serial clock line (SCL), and to the protocol format The Serial Peripheral Interface (SPI) is a synchronous serial data link that is standard across many microprocessors, other peripheral chips, in handheld systems, and in other mobile platform systems. The SPI is an interface standard defined by Motorola based on its MC68HCxx line of microcontrollers. The SPI-bus includes a 3-wire serial communications interface that is used by many microprocessor peripheral chips. It provides support for a low/medium bandwidth (1 megabaud) network connection between connected devices.

SPI bus is a relatively simple synchronous serial interface for connecting low speed external devices that use a minimal number of wires. A synchronous clock shifts serial data into and out of the micro-controllers in blocks of 8 bits. The SPI bus is a master/slave interface. Whenever two devices communicate, one is referred to as the "master" and the other as the "slave" device. The master drives the serial clock. When using SPI, data is simultaneously transmitted and received, making it a full-duplexed protocol. The bus includes the following signals: a serial clock signal (SCLK), which is always driven by the master, a master-in slave-out data signal (MISO), and a master-out slave-in data signal (MOSI).

Output Image Resolution Processing

Figure 3:
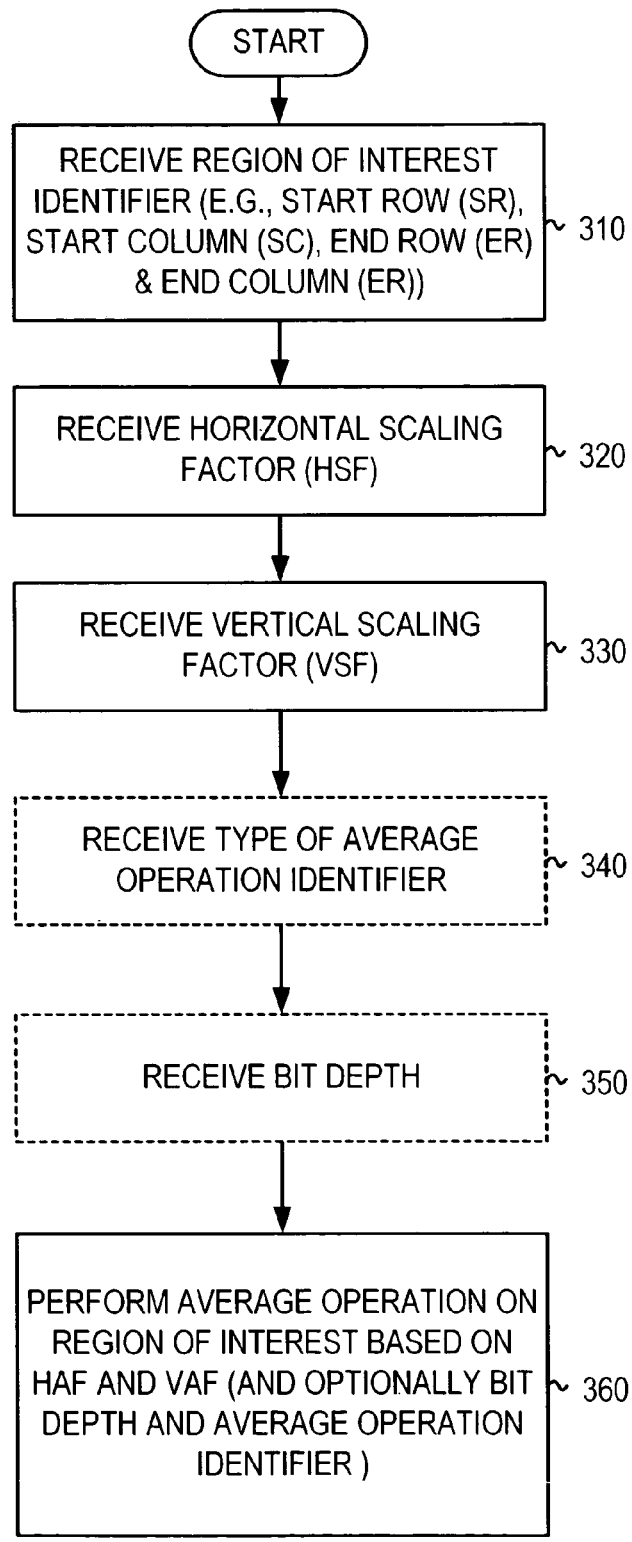
FIG. 3 is a flow chart illustrating the processing steps performed by the controller of FIG. 2 according to one embodiment of the invention.

FIG. 3 is a flow chart illustrating the processing steps performed by the controller 140 according to one embodiment of the invention. The processing steps can be divided into two stages. In a first stage, one or more output image configuration parameters are received by the controller 140 (e.g., steps 310-350). These output image configuration parameters can include, but are limited to, a vertical scaling factor (VSF), a horizontal scaling factor (HSF), a bit depth, a type of average operation identifier, and a region of interest identifier. In a second stage, these output image parameters are employed by the controller 140 to adjust the resolution of the output image (e.g., step 360).

In step 310, a region of interest (ROI) identifier is received from a region of interest register 243, for example. Step 310 can includes the step of receiving: 1) a start row (SR), a start column (SC), an end row (ER) and an end column (EC). The region of interest can be the entire image (e.g., an image with predetermined native resolution).

In step 320, a horizontal scaling factor (HSF) is received from a resolution register 240, for example. In step 330, a vertical scaling factor (VSF) is received from the resolution register 240, for example.

In step 340, a type of average operation identifier is optionally received from the type of average operation register 248, for example. When only a single type of average operation (e.g., monochrome average operation or mosaic-preserving operation) is provided by the resolution controller 220, this step may be omitted.

In step 350, a bit depth is optionally received from the bit depth register 246, for example. When a fixed predetermined bit depth is provided for each pixel in an output image, this step may be omitted.

In step 360, the averaging mechanism automatically generates an output image that complies with the configuration parameters 104 (e.g., an output image with a resolution and bit depth specified by the configuration parameters 104). Step 320 can include the sub-steps of performing an averaging operation on a group of pixels, performing an averaging operation along a first direction (e.g., a horizontal direction), performing an averaging operation along a second direction (e.g., a vertical direction), increasing the bit depth of the output image, decreasing the bit depth of the output image, increasing the resolution of the output image, decreasing the resolution of the output image, applying digital gain to the output image, etc.

According to one embodiment of the invention, step 360 includes receiving an image with a first resolution (e.g., a native resolution of the image sensor 110) and based on the configuration parameters generates an output image with a second resolution (e.g., a new resolution). For example, the output image can be a version of the input image that has been scaled in the vertical dimension according to a vertical scaling factor and scaled in the horizontal dimension according to a horizontal scaling factor.

Monochrome Averaging Operation

Figure 4:
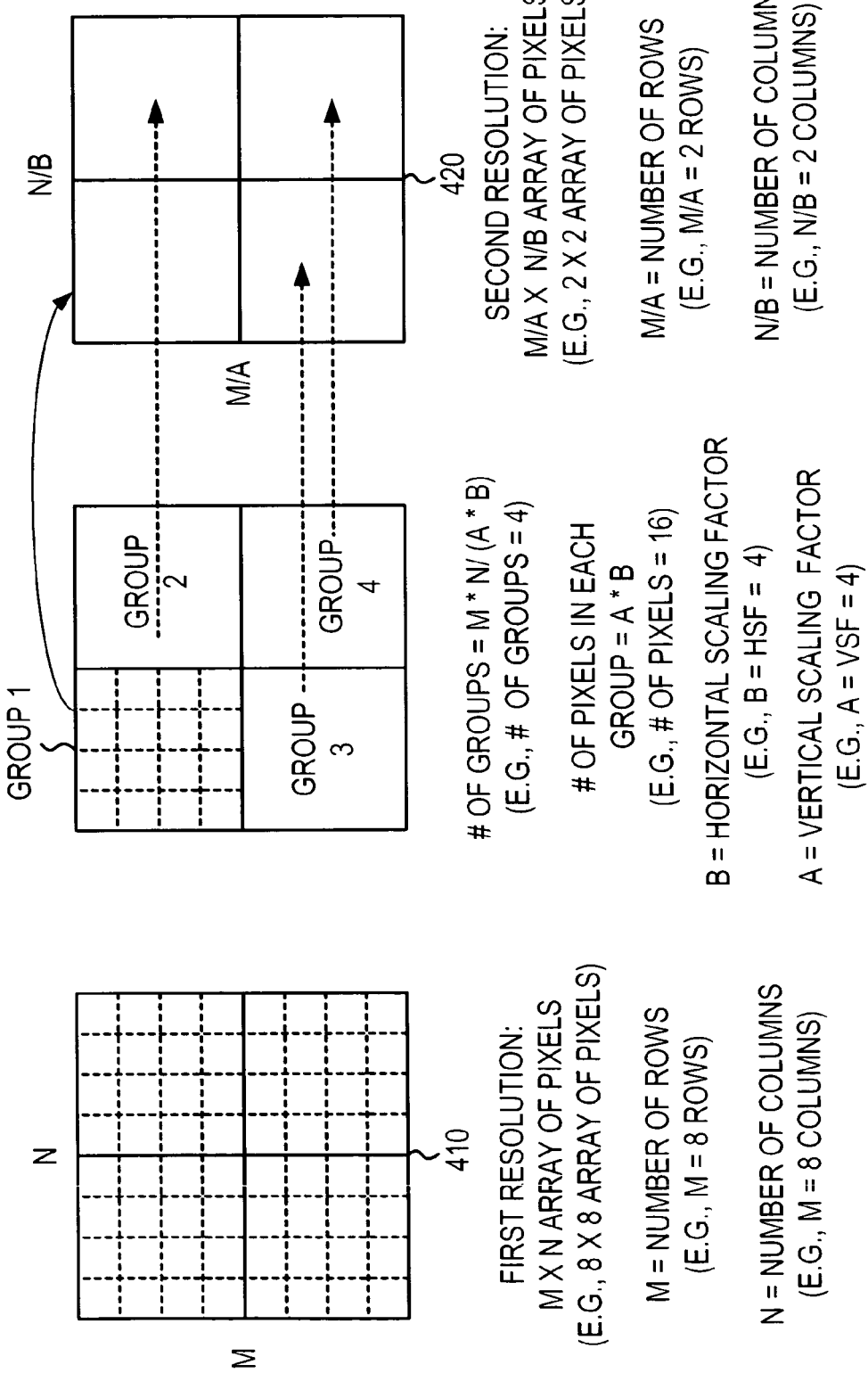
FIG. 4 illustrates a monochrome averaging operation with an exemplary pixel array according to one embodiment of the invention.

FIG. 4 illustrates a monochrome averaging operation with an exemplary pixel array according to one embodiment of the invention. An input image 410 includes M rows and N columns, which is the input image's native resolution. In this case, the input image 410 has a resolution of 8×8 pixels. The input image 410 is divided into a plurality of groups (e.g., group_1, group_2, group_3, and group_4), where each group has a predetermined number of pixels. The number of groups and the number of pixels in each group is determined by the vertical scaling factor (VSF) and the horizontal scaling factor (HSF). In this example, the HSF is four and represented by the letter "B", and the VSF is four and represent by the letter "A". The number of pixels in each group is determined by multiplying the HSF with the VSF (e.g., A*B=(8*8)/(4*4)=4). The expression is as follows:

$$\text{Number of groups}=(M*N)/A*B.$$

From this formula, the number of groups is determined to be 4.

The number of pixels in each group is determined by the following expression:

$$\text{Number of pixels per group}=(A*B).$$

In this case, the number of pixels is equal to (4*4), which is equal to 16 pixels per group. The output image 420 has a horizontal dimension of N/B and a vertical dimension of M/A. In other words, the output image 420 has a resolution of 2×2 pixels.

Mosaic-Preserving Averaging Operation

Figure 5:
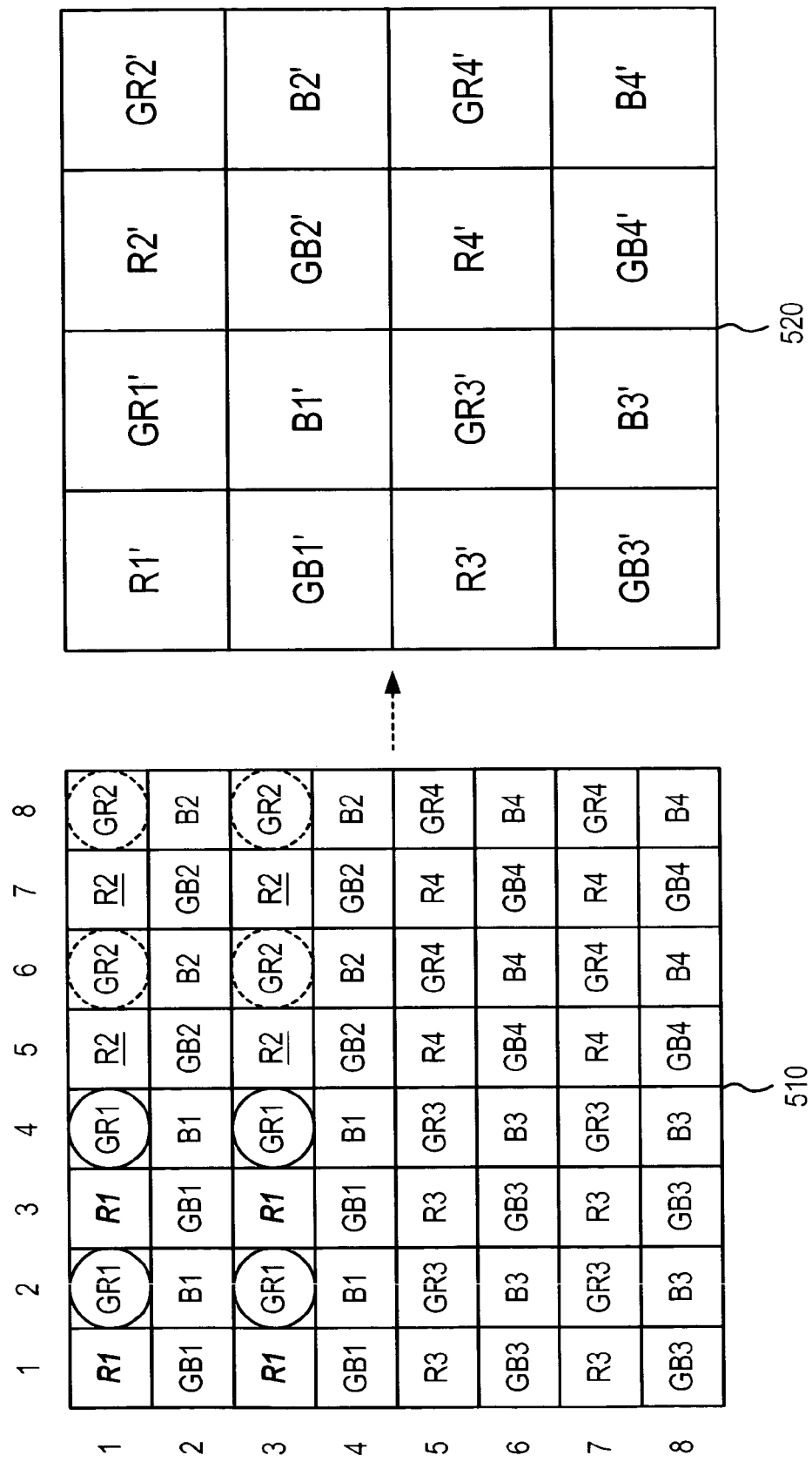
FIG. 5 illustrates a mosaic-preserving averaging operation with an exemplary pixel array according to one embodiment of the invention.

FIG. 5 illustrates a mosaic-preserving averaging operation with an exemplary pixel array according to one embodiment of the invention. The input image 510 is an 8×8 pixel array (e.g., a resolution of 8×8), and the output image 520 is a 4×4 pixel array (e.g., a resolution of 4×4). The input image 510 has a total of 64 pixels with mosaic color filter with a predetermined pattern (e.g., Bayer pattern) applied to the pixel array in the following order:

RG
GB

A horizontal scaling factor of two is applied in the horizontal direction and a vertical scaling factor of two is applied in the vertical direction of the input image 510 to generate to generate a resulting output image 520. In other words, the horizontal dimension is divided by two, and the vertical dimension is also divided by two. The output image 520 (4×4 pixel array) is one-fourth the size of the input image 510 (8×8 pixel array).

The number of pixels in each group is equal to the product of the HSF and the VSF. The number of pixels is equal to four (e.g., 2×2=4). The number of groups in the output image is equal to (number of rows*number of columns)/(HSF*VSF). The number of groups is equal to sixteen ((8*8)/(2*2)=16). Each of the sixteen groups is labeled with a corresponding label found in the input image 510 with the addition of a prime: R1', GR1', R2', GR2', GB1', B1', GB2', B2', R3', GR3', R4' GR4', GB3', B3', GB4', AND B4'.

For example, the value of R1' is the average of the values of the corresponding R1 pixels (e.g., (1, 1), (1, 3), (3, 1), (3, 3)) in the input image 510. Similarly, the value of GR1' is the average of the values of the corresponding GR1 pixels (e.g., (1, 2), (1, 4), (3, 2), (3, 4)) in the input image 510. Similarly, the value of R2' is the average of the values of the corresponding R2 pixels (e.g., (1, 5), (1, 7), (3, 5), (3, 7)) in the input image 510. Similarly, the value of GR2' is the average of the values of the corresponding GR2 pixels (e.g., (1, 6), (1, 8), (3, 6), (3, 8)) in the input image 510.

Scalable Imaging

Figure 6:
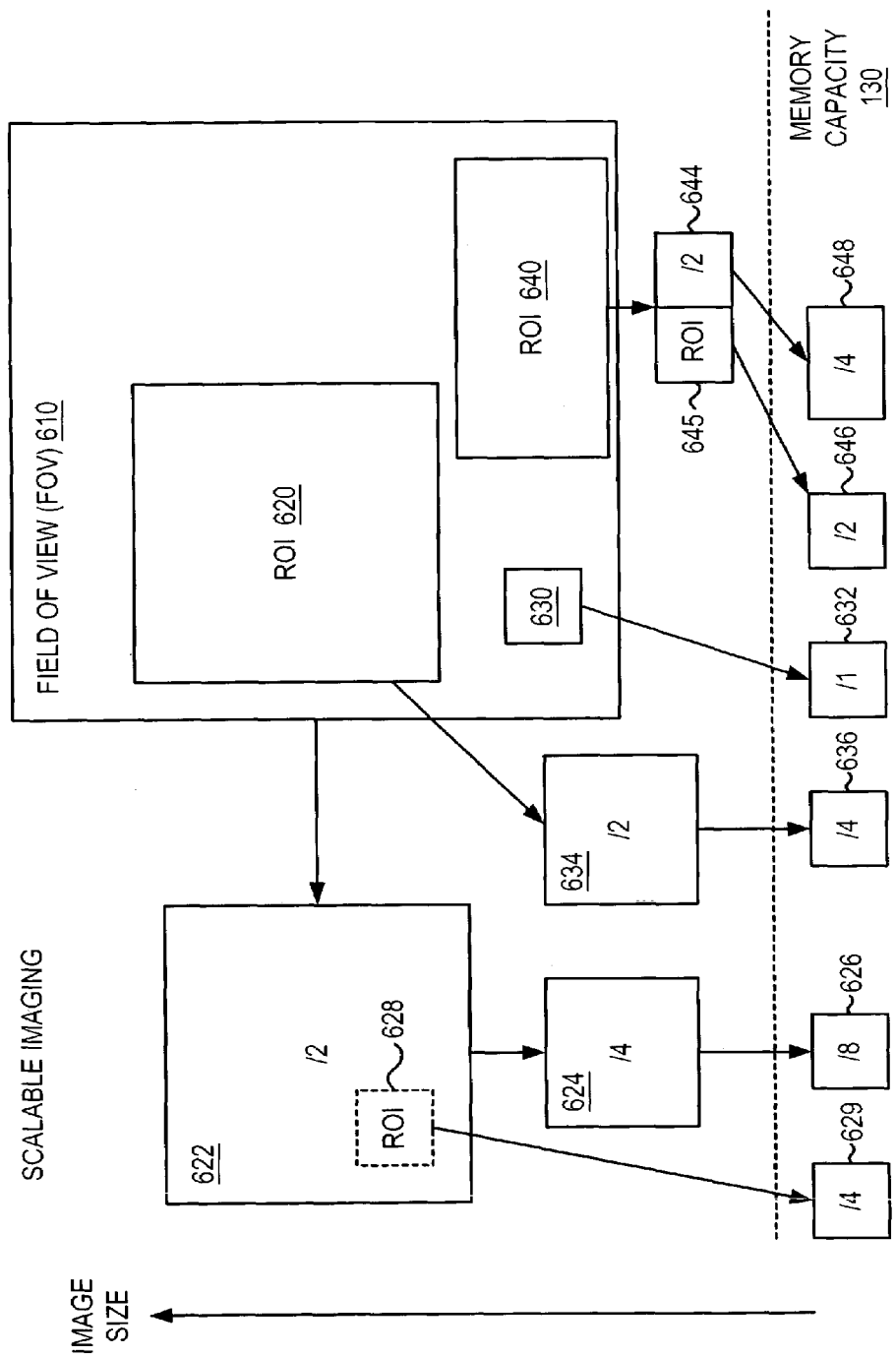
FIG. 6 illustrates scalable imaging provided by the camera of FIG. 1 according to one embodiment of the invention.

FIG. 6 illustrates scalable imaging provided by the camera of FIG. 1 according to one embodiment of the invention. The capacity of the internal memory is represented by line 130. The image includes a field of view (FOV) 610 that has a native resolution (e.g., 256×256 pixels). Many different combinations of the ROI size and the averaging factors can be used to obtain an image that will fit in the internal memory. In the field of view 610 there are the following regions of interest: a first region of interest 620, a second region of interest 630 and a third region of interest 640. ROI 620 can be scaled by a factor of four in each dimension to yield image 636 which fits within the internal memory of the camera. ROI 630 is sufficiently small to fit within the internal memory without requiring any scaling. ROI 640 can be scaled by 4 in each dimension to yield image 648, which fits in the internal memory. Alternatively one half of the ROI can be scaled by two in each dimension to yield image 646, which fits in the internal memory. Similarly image 622 is obtained by scaling the FOV by a factor of two in each dimension. ROI 628 can be scaled by another factor of two in each dimension to yield image 629, which fits in memory. Alternatively image 622 can be scaled by 4 in each dimension to yield image 626, which is represents the entire FOV scaled by 8, which fit inside the internal memory.

Distributed Image Processing Application

Figure 7:
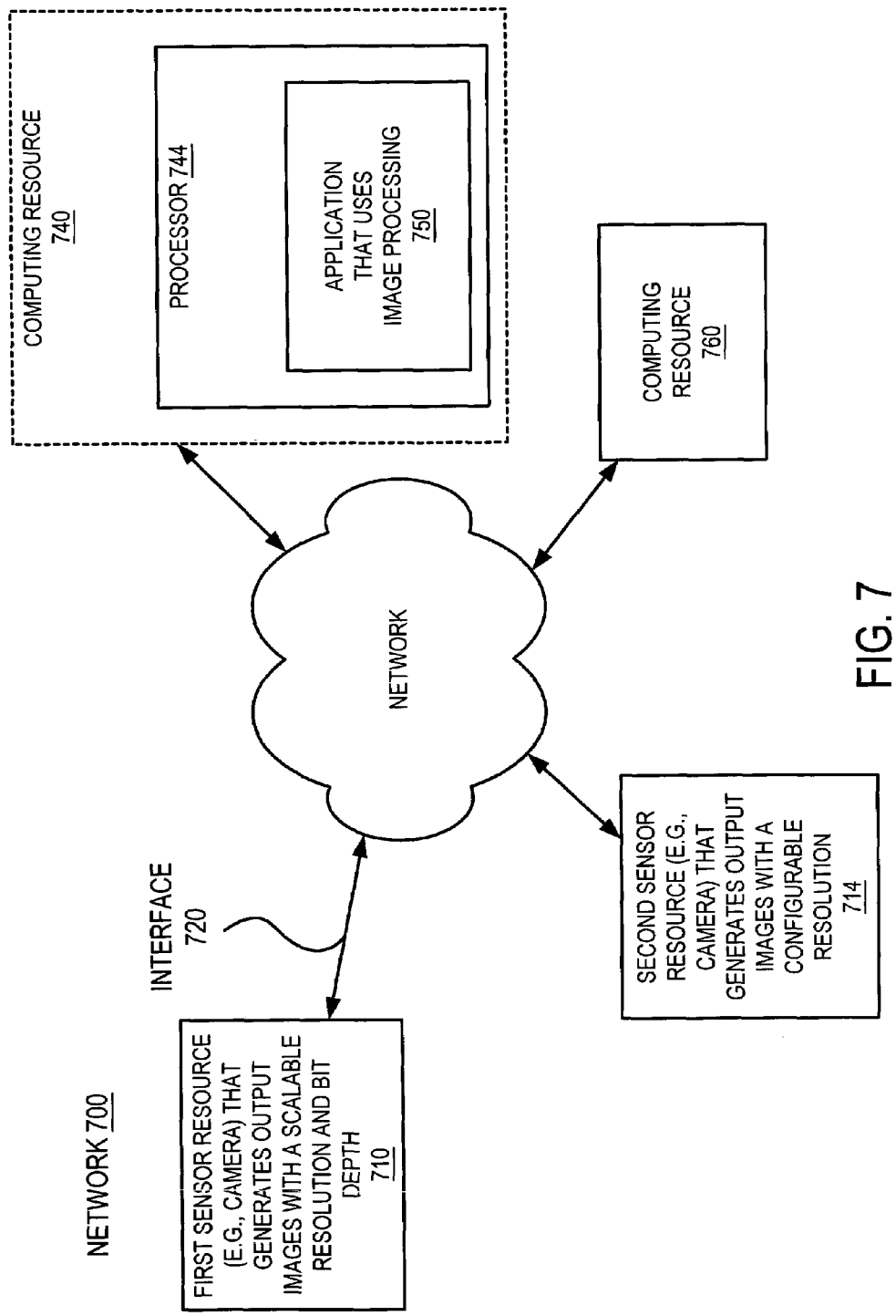
FIG. 7 illustrates a distributed network of computing resources and sensors, where the camera according to the invention is utilized therein.

FIG. 7 illustrates a distributed network 700 of computing resources and sensors, where the camera according to the invention is utilized therein. The network 700 includes a plurality of computing resources (e.g., 740 and 760) and a plurality of sensor resources (e.g., cameras). For example, the network 700 can include a first sensor resource 710 (e.g., a camera) that provides an output image with a configurable or scalable resolution according to the invention and a second sensor resource 714 (e.g., another camera) that provides output images with a configurable or scalable resolution according to the invention. It is noted that the first sensor resource 710 and the second sensor resource 714 can also have an output with selectable bit depth according to another embodiment of the invention.

The computing resource 740 can include a processor 744 that executes an application 750 that employs image processing or an image processing application. The processor 744 can be a micro-controller with limited internal memory.

It is noted that when the camera 710, 714 includes a memory buffer can operate as a slave peripheral. In this manner, a computing resource (e.g., 740, 760) in the network (e.g., a micro-controller) that performs image processing (e.g., executes an image processing application) can accept image data at a rate or pace controllable by the computing resource (e.g., 740, 760) and service interrupts without losing image data. With prior art camera architectures and network configurations, the camera is limited to being a master in the network, thereby increasing the complexity and cost of the computing resources that must accept the image data at the typically fast rate generated by the camera. Consequently, the prior art computing resources typically required expensive frame memories and digital signal processors (DSP).

The camera according to the invention enables the camera 100 to operate with a wide variety of micro-controllers for image capture and processing. It is noted that the size of the memory buffer 130 can be comparable to the size of a micro-controller's internal memory because the micro-controller typically cannot process images larger than its internal memory size.

When the camera (710, 714) is utilized to transfer image data to a processor (e.g., a micro-controller 744) with limited memory capacity, the scaling feature provided by the camera according to the invention can be used to maintain the image size constant, while the magnification is changed. For example, a camera with a native resolution of 256×256 pixels could be combined with a small microcontroller in order to perform motion detection. This may be useful as a detector in a security system. A low resolution image would be sufficient to discriminate between humans and small animals such as pets.

In some cases, the HSF and VSF can be adjusted or changed from a first frame to a second frame. For example, an image processing application may identify an interesting feature in a low magnification image and then request a higher magnification image of a region of interest of the original scene.

Although the averaging mechanisms according to the invention have been described by the various embodiments shown in the figures, other arrangements can be devised in accordance with the teachings of the invention to realize other cameras and imaging devices that provide scalable resolution and bit depth.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A camera that generates output images of configurable resolutions comprising:
   a) a resolution controller that receives an image with a first resolution, a horizontal scaling factor (HSF), and a vertical scaling factor (VSF), and based thereon generates an output image with a second resolution; and
   b) a memory buffer coupled to the resolution controller for storing at least one output image;
   wherein the resolution controller includes an M-average mechanism that performs a monochrome average operation on the image with the first resolution based on the horizontal scaling factor (HSF) and the vertical scaling factor (VSF);

the resolution controller scales the horizontal dimension by the horizontal scaling factor (HSF) and the vertical dimension by the vertical scaling factor (VSF) to generate the output image with the second resolution; and a region of interest (ROI) identifier is received by the resolution controller including a start row (SR), a start column (SC), an end row (ER) and an end column (EC) of the received image for scaling the horizontal dimension and vertical dimension of the identified ROI.

2. The camera of claim 1 wherein the resolution controller includes a MP-average mechanism that performs a mosaic preserving average operation on the image with the first resolution based on the horizontal scaling factor (HSF) and a vertical scaling factor (VSF); wherein the output image includes color information.

3. The camera of claim 1 further comprising:
c) an interface controller that manages communication of data between the camera and an interface.

4. The camera of claim 3 wherein the interface controller includes a serial interface controller that manages communication of data between the camera and a serial interface.

5. The camera of claim 4 wherein the serial interface controller that manages communication of data between the camera and one of a Serial Peripheral Interface (SPI) and an Inter Integrated Circuit (I2C) interface.

6. The camera of claim 1 further comprising:
a resolution register to store the vertical scaling factor (VSF) and the (horizontal scaling factor) HSF.

7. The camera of claim 1 further comprising:
a register to store a bit depth value;
a register to store a type of average operation identifier; and
a register to store a region of interest.

8. The camera of claim 1 further comprising:
a register to store a start column; a register to store a start row; a register to store a stop column; and a register to store a stop row.

9. The camera of claim 1 further comprising:
an image sensor to receive light and based thereon to generate the image with the first resolution with a plurality of rows and columns based on the received light; wherein the image with the first resolution generated by the image sensor has a native resolution of M×N.

10. The camera of claim 1 wherein the resolution controller includes a bit depth controller that receives a bit depth and based thereon adjusts the number of bits that are used to represent each pixel in the output image with the second resolution.

11. The device of claim 1 wherein the resolution controller is implemented in an application specific integrated circuit (ASIC), an application specific standard product (ASSP).

12. The camera of claim 1 wherein the identified ROI is the entire received image.

13. The camera of claim 1 wherein the identified ROI is a portion of the received image.

14. The camera of claim 1 further comprising
another ROI identifier is received by the resolution controller including a start row (SR), a start column (SC), an end row (ER) and an end column (EC) of the received image for scaling horizontal and vertical dimensions of the other identified ROI.

15. The camera of claim 14 wherein the identified ROI and the other identified ROI are each portions of the received image.

16. The camera of claim 14 wherein the identified ROI and the other identified ROI are each different portions of the received image.

17. The camera of claim 14 wherein the identified ROI and the other identified ROI are scaled by different HSFs and different VSFs.

18. A distributed application embodied in a storage device comprising:
a) an image processing application that requires an image with a first image resolution and a first bit depth;
b) a camera processing application that generates output images with a native resolution of m×n and a scalable resolution and bit depth;
wherein the camera processing application includes a mechanism that receives at least One average factor from the image processing application and based thereon for generating an output image for the camera processing application that has a configured image resolution and a configured bit depth;
wherein the camera processing application includes an M-average mechanism that performs a monochrome average operation on an image with the first resolution based on the horizontal scaling factor (HSF) and a vertical scaling factor (VSF);
the M-average mechanism scales the horizontal dimension by the horizontal scaling factor (HSF) and the vertical dimension by the vertical scaling factor (VSF) to generate an output image with a second resolution; and
a region of interest (ROI) identifier is received by the camera processing application including a start row (SR), a start column (SC), an end row (ER) and an end column (EC) of the received image for scaling the horizontal dimension and vertical dimension of the identified ROI.

19. The application of claim 18 wherein the camera processing application includes a MP-average mechanism that performs a mosaic preserving average operation on an image with the first resolution based on the horizontal scaling factor (HSF) and a vertical scaling factor (VSF); wherein the output image includes color information.

20. The application of claim 18 wherein the camera processing application includes a bit depth controller that receives a bit depth and based thereon adjusts the number of bits that are used to represent each pixel in the output image.

21. The application of claim 18 wherein the image processing application and camera processing application communicate through an interface; wherein the camera processing application includes an interface controller that manages communication of data between the camera processing application and the interface.

* * * * *